(12) United States Patent
Corey

(10) Patent No.: US 7,853,351 B2
(45) Date of Patent: Dec. 14, 2010

(54) CNC MACHINE TOOL AND INTEGRATED MACHINE TOOL CONTROLLER INCORPORATING 3D AND UP TO 8-AXES REAL TIME INTERACTIVE TOOL COMPENSATION

(76) Inventor: Gary John Corey, 21445 Bundy Canyon Rd., Wildomar, CA (US) 92595

( * ) Notice: Subject to any disclaimer, the term of this patent is extended or adjusted under 35 U.S.C. 154(b) by 641 days.

(21) Appl. No.: 11/906,265

(22) Filed: Oct. 1, 2007

(65) Prior Publication Data
US 2008/0091295 A1   Apr. 17, 2008

Related U.S. Application Data

(63) Continuation-in-part of application No. 10/079,309, filed on Feb. 21, 2002, now abandoned.

(51) Int. Cl.
*G06F 19/00* (2006.01)
(52) U.S. Cl. .................. 700/193; 700/178; 700/180; 700/188; 700/192
(58) Field of Classification Search .............. 700/193, 700/178, 180, 188, 192
See application file for complete search history.

(56) References Cited

U.S. PATENT DOCUMENTS

| | | | | |
|---|---|---|---|---|
| 4,608,747 A | | 9/1986 | Link et al. | |
| 4,988,935 A | * | 1/1991 | York | 318/568.18 |
| 5,043,906 A | * | 8/1991 | Jepson | 700/192 |
| 5,550,483 A | * | 8/1996 | Boyette et al. | 324/758 |
| 6,022,132 A | | 2/2000 | Schulz | |
| 6,167,325 A | | 12/2000 | Kamiguchi et al. | |
| 6,225,771 B1 | | 5/2001 | Hammerle | |
| 6,651,308 B2 | * | 11/2003 | Oldani | 29/558 |

* cited by examiner

*Primary Examiner*—Paul L Rodriguez
*Assistant Examiner*—Carlos Ortiz Rodriguez

(57) ABSTRACT

A CNC machine tool deflection compensation system intergrated in a CNC machine tool Controller for providing continuous, accurate, real-time compensation for unintended and/or undesired axis coordinate deflections from a preprogrammed path of tool movement in a coordinate plane, so as to ensure that the tool remains on its programmed path irrespective of such deflections capable of continuously detecting, in real-time, the presence, magnitude an rate of change of such undesired deflections and simulataneoulsy genereating instrtuctions to initiate equal and opposite deflections at the same rate of change, thereby ensuring that the tool remains on its preprogrammed path irrespective of the inherently occuring undesired deflection and/or the precipitating causes(s) thereof. The algorithms empolyed provide for automatic gouge avoidance protection and/or relocation of the tool to safe positions when necessary. All foregoing features are built into the CNC Controller at the outset, thus obviating the need for intervention by the machining operator.

12 Claims, 11 Drawing Sheets

CNC MACHINE TOOL AND INTEGRATED MACHINE TOOL CONTROLLER INCORPORATING 3D AND UP TO 8-AXES REAL TIME INTERACTIVE TOOL COMPENSATION

RELATED APPLICATION

The present application is related to, based on, a continuation-in-part of, and, for all common subject matter contained therein, claims priority from, Applicant's application Ser. No. 10/079,309, filed Feb. 21, 2002 now abandoned, entitled "MULTI-AXES TOOL COMPENSATION—3D AND 5-AXIS REAL TIME INTERACTIVE TOOL COMPENSATION INSIDE THE CNC MACHINE TOOL CONTROLLER." The aforesaid application Ser. No. 10/079,309 is being expressly abandoned—but not the invention(s) disclosed therein which are disclosed and claimed in this continuation-in-part application—immediately following the filing of this continuation-in-part application.

BACKGROUND OF THE INVENTION

1. Field of the Invention

The present invention relates generally to the field of CNC machine tools; and, more particularly, concerns methods carried out by, and apparatus incorporated in, the CNC machine tool's integrated Controller which enable real-time interactive X, Y and/or Z compensation for changes in tool orientation and/or dimensions as the tool is moving along a predetermined path relative to the workpiece during a machining operation programmed into the machine tool Controller.

2. Prior Art

Typically, prior art machine tools have employed, and still employ, a CNC machine tool and integrated controller therefore which were, and are, capable of 3D and multi-axis movement relative to a workpiece during a pre-programmed machining operation; and, in some instances such prior art equipment has also been capable of, and programmed to conduct, certain other machining operations. However, in those instances where the machining operation requires, for example, contouring and/or shaping steps that, in turn, require tilting of the tool relative to two or more of the typical 3D X, Y and/or Z coordinates, serious problems have been encountered. In an attempt to resolve those problems, the CNC machine tool operator has been required to temporarily terminate the machining operation and employ the services of a CNC computer programmer to create an entirely new CNC "G" code program with new tool positions and definitions in every instance where a change is to be made. Such "solutions" were, and are, time consuming and expensive, generally requiring remotely located programmers and equipment, often interfering with other completely unrelated, but urgent, time-consuming programming considerations and/or schedules.

The following patents are representative of typical prior art machine tools and/or CNC machine tools, which can, and sometimes do, encounter such problems:

U.S. Pat. No. 6,225,771B1—Hammerle
U.S. Pat. No. 6,167,325—Kamiguchi et al.
U.S. Pat. No. 6,022,132—Schulz
U.S. Pat. No. 4,608,747—Link et al.

Additional prior art documents of general interest include:

1. STORI, J. A. and P. K. WRIGHT. A constant engagement offset for 2½ D tool path generation. Proc. 1998 Intl. Mech. Engr. Congr. And Expo. (Anaheim, Calif., November 1998) MED-vol. 8, 475-481 (1998).
2. DeVOR, R. E., S. G. KAPOOR, R. ZHU, K. JACOBUS, I. LAZOGLU, S. SASTRY, and M. VOGLER. Development of mechanistic models for the prediction of machining performance: Applications to process and product quality. Proc. CIRP Intl. Wkshp. on Modeling of Machining Oper. (Atlanta, Ga., May 1998) 407-416 (1998).
3. FLORES, M. A. and T-C. TSAO. Supervisory machining control implementation using an open architecture CNC. Proc. Japan-USA Symp. On Flexible Automat. (Otsu, Japan, July 1998) 1157-1164 (1998).
4. GAJJELA, R. R., S. G. KAPOOR, and R. E. DeVOR. A mechanistic force model for contour turning. 1998 Intl. Mech. Engr. Congr. and Expo. (Anaheim, Calif, November 1998) 8, 149-159 (1998).
5. KAPOOR, S. G., R. E. DeVOR, R. ZHU, R. GAJJELA, G. PARAKKAL, and D. SMITHEY. Development of mechanistic models for the prediction of machining performance: model-building methodology. Proc. CIRP Intl. Wkshp. on Modeling of Machining Oper. (Atlanta, Ga., May 1998) 109-120 (1998).
6. KUMAR, P. and P. M. FERREIRA. Hierarchical control of flexibly automated manufacturing systems. Proc. Japan-USA Symp. on Flex. Automat. (Otsu, Japan, July 1998) 111, 1207-1214 (1998).
7. K. KOTHARDARAMAN, KUMAR, P., and P. M. FERREIRA. Scalable, maximally-permissive deadlock avoidance for FMS. IEEE Conf. on Robotics and Automat. (Leuver, Belgium, May 1998).
8. Pro/MFG Technical Meeting at the Omni Rosen Hotel, Orlando, Fla., Jun. 17, 2000 Compiled by Gene J. Maes.

SUMMARY OF THE INVENTION

The present invention overcomes the problems and disadvantages inherent in the design, construction and operation of conventional CNC machine tools and Controllers therefore by providing methods and apparatus in the form of a CNC Controller which are integratable with virtually any type of CNC machine tools, yet which are capable of instantaneous real-time tool compensation for deviations from pre-programmed X, Y and/or Z coordinates on a pre-programmed machine tool path, which deviations are attributable to, for example: i) changes in tool dimensions; ii) programmable inclinations of the tool relative to two or more established X, Y and/or Z coordinates to positions where the tool is disposed at an included acute angle $\alpha$ with the Z-axis coordinate—an acute included angle which may be continuously changing—between the inclined tool axis and the Z-axis coordinate, thereby also resulting in angular relationships between the tool axis and the X- and/or Y-axis coordinates; iii) changes in the rotational angle $\beta$ of the tool about the vertical Z-axis coordinate; and iv), the location of the tool in the X, Y coordinate plane.

More specifically, it is a general aim of the present invention to provide methods and apparatus which permit of rapid, continuous real-time compensation for tool deviations from a CNC pre-programmed machine tool path, which deviations are attributable to: i) changes in tool dimensions; ii) pre-programmed inclinations of the tool axis with respect to at least two of the X, Y and/or Z coordinates in a 3D system resulting in a variable acute included angle $\alpha$ between the tool axis and the Z-axis coordinate, and angular relationships between the tool axis and at least one of the X and/or Y coordinates; iii) changes in the rotational angle $\beta$ of the tool in the X,Y coordinate plane; and/or iv), the location of the tool in the X,Y coordinate plane; thereby continuously maintaining the tool precisely on its pre-programmed machining path irrespective of such deviations. Stated differently, it is an object of the present invention to provide methods and apparatus for enabling continuous real-time compensation for tool deviations from a predetermined path in a 3D X,Y,Z coordinate system without requiring interruption of the machine program and without requiring independent intervention by a computer programmer using additional computer equipment, generally at a remote location, and/or creation of a newly generated CNC program.

A further and more detailed object of the invention is the provision of a real-time tool deflection detection system, and methods for employing same, wherein the sets of algorithms initially programmed into the CNC Controller are capable of continuously detecting, in real time, the presence, magnitude and rate of change of undesired X, Y and/or Z deflections and simultaneously generating instructions to initiate equal and opposite X, Y and/or Z deflections at the same rate of change so as to ensure that the tool remains precisely on its preprogrammed path of movement at all times irrespective of the inherently occurring undesired deflections and/or the precipitating cause thereof, all without requiring interruption of the machining program and/or intervention by a computer programmer and changes in, or modification of, the algorithms and/or instructions initially programmed into the CNC Controller.

Ancillary objectives of the present invention include provision of algorithms initially programmed into the CNC Controller which, in addition to ensuring automatic real-time compensation for undesired X, Y and/or Z tool deflections, additionally ensure: i) automatic gouge avoidance protection; and ii), relocation of the tool to safe positions when necessary.

DESCRIPTION OF THE DRAWINGS

These and other objects of the present invention will become more readily apparent upon reading the following Detailed Description and upon reference to the attached drawings in which:

FIG. 2 is a pictorial view of a tool parameter computer screen for defining multi-axes tool compensation and 3D tool characteristics;

FIG. 10 is a view generally illustrating exemplary machine instructions carried out in the CNC Controller of the present invention; and, FIG. 11 is a flowchart in block diagrammatic form depicting each technology element incorporated in the present invention.

Figure 1:
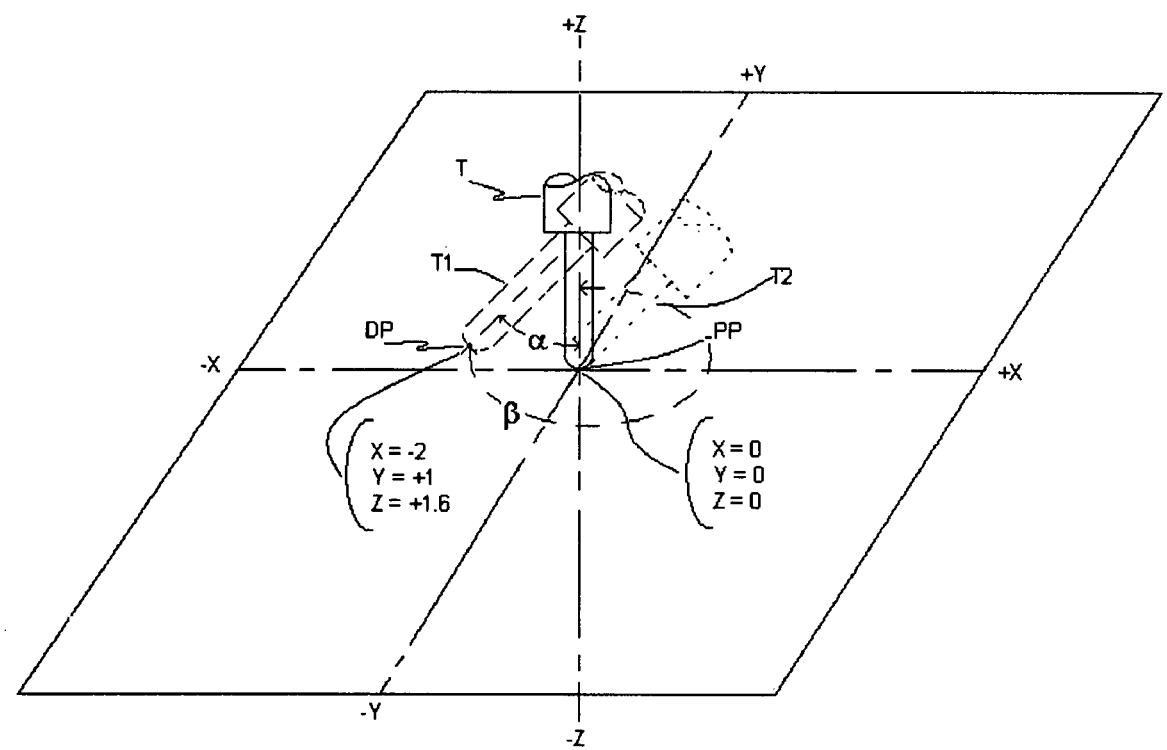
FIG. 1 is a highly diagrammatic, graphic representation depicting a fragmentary portion of an exemplary machine tool in solid lines oriented at a specific Programmed Point PP on a pre-programmed tool path in a machining operation to be performed in a 3D X,Y,Z coordinate system; and, depicting also the same tool in broken lines displaced from the desired Programmed Point PP to X,Y,Z coordinate positions at a Displaced Point DP as a result of tilting the tool so it defines an acute included angle α with the initial Z-axis coordinate and angular relationships with at least one of the X and/or Y coordinates after having been rotated through a rotational angle β about the original Z-axis coordinate; and finally, depicting in dotted lines the position of the tool during tilting as a result of the deviation compensation system programmed in the CNC Controller of the present invention.

While the present invention is susceptible of various modifications and alternative forms, specific embodiments thereof have been shown by way of example in the drawings and will herein be described in detail. It should be understood, however, that it is not intended to limit the invention to the particular forms of the invention disclosed and/or described; but, on the contrary, the intention is to cover all modifications, structural equivalents, equivalent structures, and/or alternatives falling within the spirit and scope of the invention as expressed in the appended claims. For example, in FIG. 1 the invention has been depicted in a 3D X,Y,Z coordinate system wherein the X and Y coordinates are normal to one another in a horizontal plane and intersect with one another and with the Z coordinate at a point (X=0, Y=0, Z=0) disposed in the center of the XY coordinate plane. However, those skilled in the art will appreciate that the XY coordinate plane need not be horizontal while the X=0, Y=0 and/or Z=0 coordinate start position can be located anywhere in the imaginary XY coordinate plane, at any point on the periphery of that imaginary plane, or even outside the periphery of that plane. Moreover, it will be understood that the tool can be movable or stationary and, if stationary, then the workpiece can be movable, or both the tool and workpiece can be movable, all under the control of the CNC Controller.

Consequently, in the appended claims, means-plus-function clauses and similar clauses are intended to cover: i) the structures described herein as performing a specific recited function; ii) structural equivalents thereof; and iii), equivalent structures thereto. For example, although a nail and a screw may not be deemed to be structural equivalents since a nail employs a cylindrical surface to secure wooden parts together while a screw employs a helical surface, in the art broadly pertaining to the fastening of wooden parts, a nail and a screw should be deemed to be equivalent structures since each perform the recited fastening function.

DETAILED DESCRIPTION

Turning now to the drawings, and directing attention first to FIG. 1, there has been illustrated in highly diagrammatic 3D form, a typical programming situation for a CNC machine tool depicting one type of programming problem that can be encountered when shifting a multi-axes tool to, for example, an inclined position defining an acute included angle α with the Z coordinate in a 3D X,Y,Z coordinate system. Moreover, as here shown, the problem is exacerbated when the tool T is simultaneously rotated through a rotational angle β about the Z axis as the tool is moved along a predetermined path established by the particular program written into the tool's CNC Controller (not shown in FIG. 1).

Thus, as here shown in solid lines, an exemplary tool T is, at this particular instant in time, disposed coaxially on a Z coordinate passing through the intersection of the X and Y coordinates at X=0, Y=0 defining a Programmed Point PP on the programmed path of movement of the tool T in the XY plane as determined and controlled by the CNC Controller. If it is assumed that at that precise instant in time the CNC Controller issues an instruction for the tool T to be tilted through: i) an acute included angle $\alpha$ (for example, 20°) with the Z coordinate; and ii), simultaneously through a rotational angle $\beta$ (for example, 280°) about the Z coordinate, all while the tool is moving linearly and/or curvilinearly along its programmed path (not shown) in a shaping or contouring operation, then it will be appreciated that, absent the present invention, the work engaging tip of the tool T will be displaced vertically (i.e., a +Z increment such, for example, as +1.6) and, at the same time, into the −X,+Y quadrants of the XY plane by displacements −X and +Y which may, for example, be X=−2 and Y=+1. Thus, the tool is shifted from the solid line position T shown in FIG. 1 (where X=0, Y=0, Z=0) to the broken line position T1 (where X=−2, Y=+1, Z=+1.6). In short, absent the present invention, the tip of the tool is displaced from its mandatory Programmed Point PP on the programmed path of tool movement relative to the workpiece to an inaccurate and unacceptable Displaced Position DP which is no longer on the programmed path of tool movement. Prior to the advent of the present invention, such a situation would be anticipated by the machine operator who would then have to interrupt the machining operation and procure the services of some remotely located computer programmer who would have to calculate new instructions to be programmed into the CNC Controller to obviate the problem and compensate for the undesired X, Y and Z displacements from the Programmed Point PP to the Displaced Point DP. Moreover, the foregoing problem is further compounded by the fact that the CNC machine tool is, presumably, in constant motion under the control of the CNC Controller, and will, therefore, continue to encounter changing conditions that produce unwanted tool displacements from the preprogrammed path of tool movement.

In accordance with one of the important aspects of the present invention, the foregoing problems are obviated by initially programming instructions into the CNC Controller which take into account those variables that can, and do, produce unwanted tool displacements—such, for example, as: i) changes in the tool dimensions; ii) changes in the acute included angle $\alpha$ between the tool axis and the Z coordinate passing through the tool's pivot point and the Programmed Point; iii) changes in the rotational angle $\beta$ (it will be understood that the angles $\alpha$ and $\beta$ are both constantly changing as the tool is tilted from its initial vertical solid line position T, or any other initial position, towards its new broken line position T1, or any other new position); and iv), changes in the X,Y and/or Z coordinate positions of the tool as it moves along its predetermined programmed path. Those skilled in the art will appreciate that any and/or all of the foregoing unwanted X, Y and/or Z coordinate displacements will serve to displace the tool from its Programmed Points on the programmed path of tool movement. However, keeping in mind that the CNC Controller's artificial intelligence is continuously monitoring and recording all tool displacements, both wanted and unwanted, the CNC Controller is also initially programmed to generate, in response to detected and recorded unwanted X, Y and/or Z tool deflections which are continuously changing, a set of compensating X, Y and/or Z deflections to counteract the unwanted X, Y and/or Z tool displacements.

Thus, in carrying out the invention, the instructions programmed into the CNC Controller at the outset take into account those variables which can contribute to unwanted X, Y and/or Z displacements and include displacement compensating instructions based upon the magnitudes of the variables $\alpha$ and $\beta$ as they continuously change during a tool tilting cycle. In the exemplary case shown in FIG. 1, those compensating instructions will cause equal and opposite tool deflections in the X, Y and/or Z coordinates concurrently with tilting of the tool so that while the tool is tilting, the compensatory deflections occur simultaneously; and, in the exemplary situation depicted in FIG. 1, by the instant that the tool is in its fully tilted position where $\alpha$=20° and $\beta$=280°, the X, Y and Z compensating deflections will aggregate X=+2, Y=−1 and Z=−1.6, thereby insuring that the tool is in the desired inclined position T2 shown in dotted lines with the tip of the tool still disposed at the desired Programmed Point PP on the programmed path of tool movement as determined by the CNC Controller. And, it is significant to note that in carrying out the present invention, the magnitudes of the compensatory deflections are, at all times, instantaneously related to the magnitudes of the changing variables (e.g., $\alpha$ and $\beta$) so as to ensure that during the tilting operation as the tool shifts from the solid line position T (shown in FIG. 1) to the dotted line position T2, the work engaging tip of the tool never shifts from the Programmed Point PP on the programmed path of tool movement as determined by the CNC Controller. As a consequence, when the CNC Controller initiates a tool tilting cycle of operation (or any similar tool positioning operation) it is not necessary to interrupt the machining operation or to require a remotely located computer programmer to calculate compensatory instructions and reprogram the CNC Controller.

Figure 2:
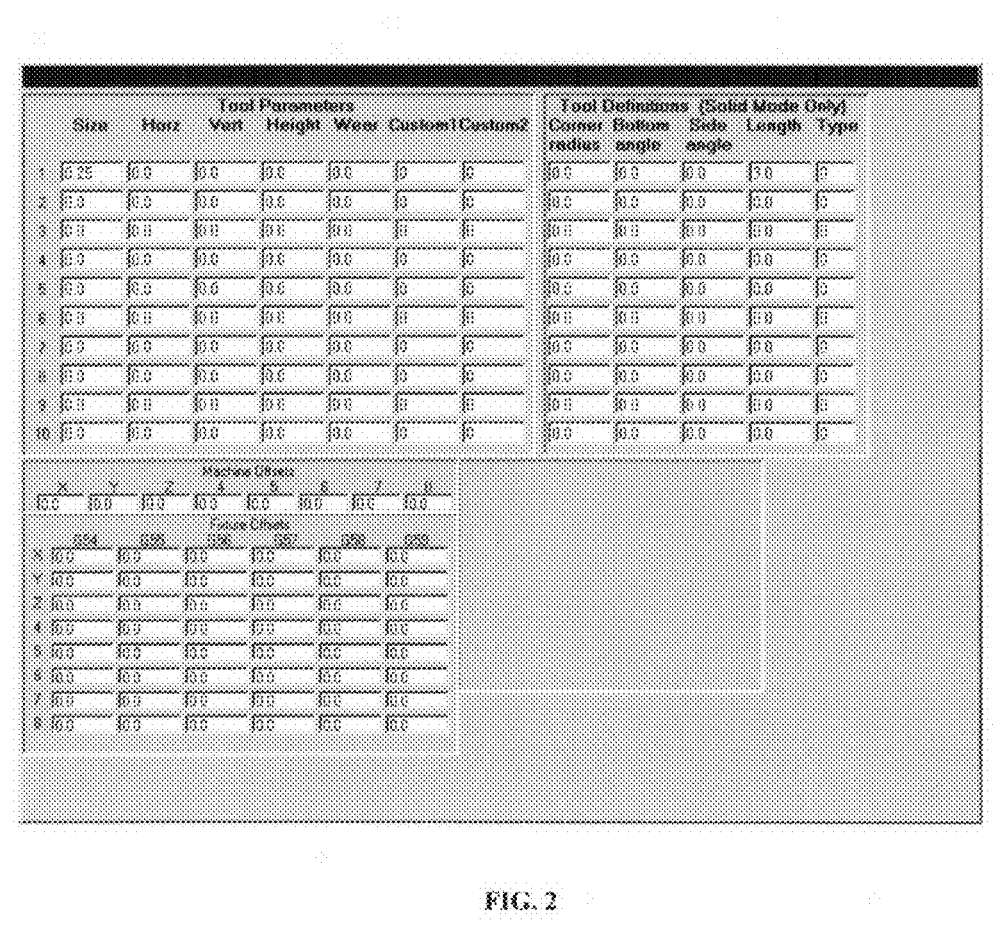

The exemplary embodiments that best describe the Multi-axes Tool Compensation characteristics are to provide the CNC machinist using CNC Controllers a convenient method for applying tool compensation in up to 8 axes similar to the methods they now enjoy when using the traditional 2D tool comp standards G41 and G42 using user input boxes from FIG. 2, which stores up to 8 dimensional axes information in the Database Element as described and enumerated as paragraph (0030) of the Computer Program Listing on compact disc (See, Appendix A).

As will be described herein, CNC controllers have not, at least prior to the present invention, been technically advanced enough to employ multi-axes tool compensation methods. Shown below are the variables used and how the calculations are made in the central set of math routine algorithms.

Element Title: Vector and Matrix Subroutine.

U, V, W are the end result of the compensated tool positions.

Figure 3:
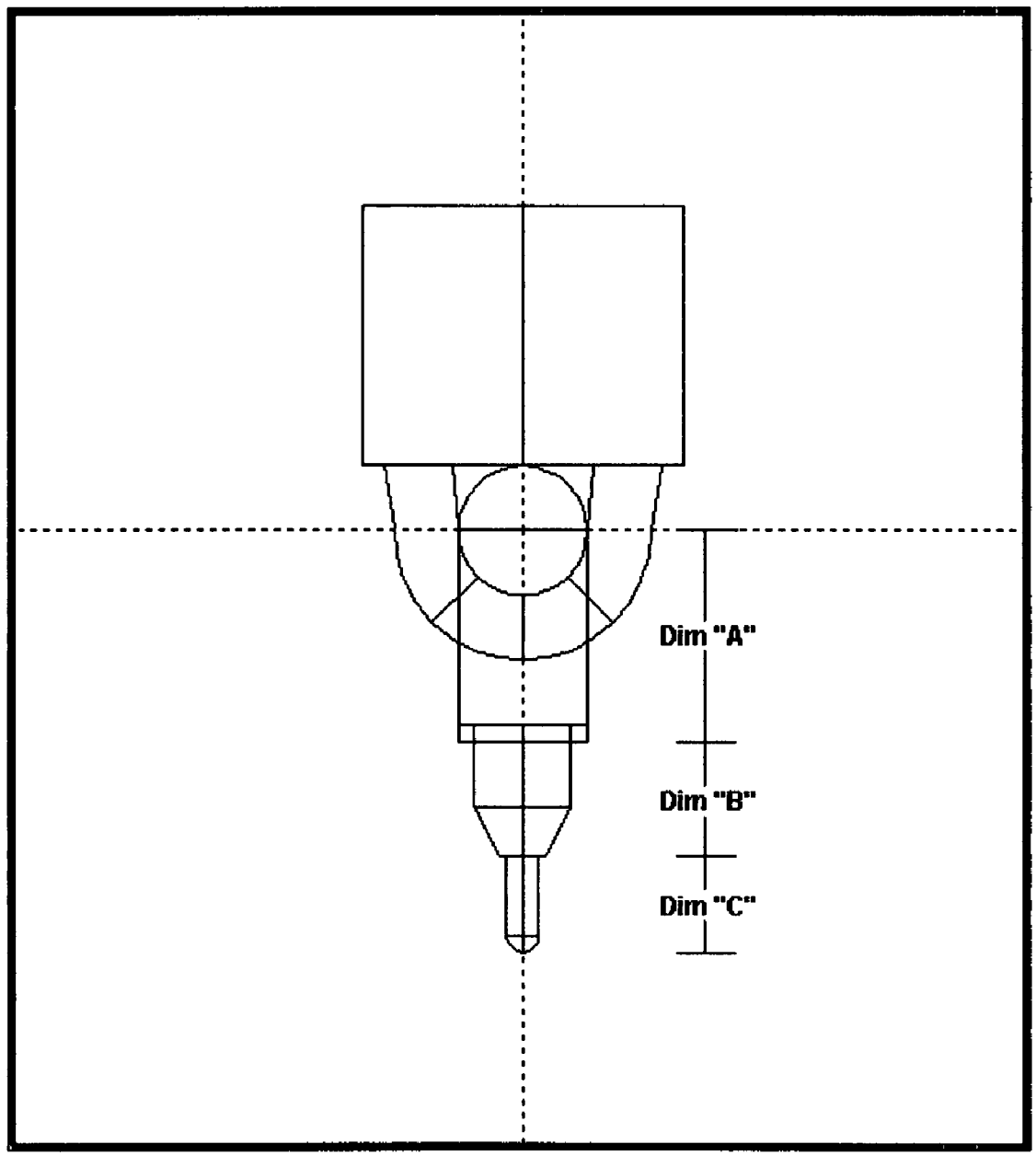
FIG. 3 is a diagrammatic side elevation of a tool positioned in the tool holder of a typical CNC machine tool, here depicting selected compensation lengths in the CNC Controller of the present invention.

D=the distance or combined length of FIG. 3. Dim "A" Item 2, Dim "B" Item 3 and Dim "C" Item 4.

Vx, Vy, Vz are the 3D vector component values.

X, Y, Z is the original non-compensated tool position.

U=D*Vx+X.

V=D*Vy+Y.

W=D*Vz+Z.

Using these defined methods of the invention for multi-axes tool compensation, the machine operator now has a pre-defined method to assign 3D and up to 8-axes tool characteristics at the CNC Controller. As such, this set of central math routine algorithms shows using variables to show the math matrix calculation shown below:

Element Title: Central Subroutine.

$Cz=Cos(Rz):Sz=Sin(Rz):Cx=Cos(Rx):Sx=Sin(Rx):$
$Cy=Cos(Ry):Sy=Sin(Ry).$

'Z rotate, counter clockwise.

$X1=U*Cz+V*Sz:Y1=U*-Sz+V*Cz:Z1=W.$

'Y rotate, back.

$X2=X1:Y2=Y1*Cx+Z1*-Sx:Z2=Y*Sx+Z1*Cx.$

'X rotate, left.

$U=X2*Cy+Z2*-Sy:V=Y2:W=X2*Sy+Z2*Cy.$

The database is an internal list for storage of events, variables, conditions and positions kept in standard computer random access memory. The format for this information is kept in multiple sequential standard matrix arrays. The data is accessed randomly as needed. The formats are double matrix array, as shown below, for all collected and gathered user data, variables and positions:

Element Title: Database Subroutine.
Position1(X,Y,Z,4,5,6,7,8).
Position2(X,Y,Z,4,5,6,7,8).
Position3(X,Y,Z,4,5,6,7,8).
Etc . . . to Nth Position.
Position Nth(X,Y,Z,4,5,6,7,8).
VariableData1(Var1,Var2,Var3,Var4,Var5,Var6,Var7,Var8).
VariableData2(Var1,Var2,Var3,Var4,Var5,Var6,Var7,Var8).
VariableData3(Var1,Var2,Var3,Var4,Var5,Var6,Var7,Var8).
Etc . . . to Nth.
VariableData Nth(Var1,Var2,Var3,Var4,Var5,Var6,Var7,Var8).
UserData1(User1,User2,User3,User4,User5,User6,User7,User8).
UserData2(User1,User2,User3,User4,User5,User6,User7,User8).
UserData3(User1,User2,User3,User4,User5,User6,User7,User8).
Etc . . . to Nth.
UserData Nth(User1,User2,User3,User4,User5,User6,User7,User8).

The Database subroutine calls, ties to and works together with the Element titled DbAtr enumerated as paragraph (0043), Element titled DbGet enumerated as paragraph (0044), Element titled DbSet enumerated as paragraph (0045) and Element titled DbSetAtrCur enumerated as paragraph (0046) of the Computer Program Listing on compact disc (See, Appendix A).

Those skilled in the art will of course appreciate that CNC programmers now have the tools to issue 3D and up to 8-axes tool compensation commands, which have not been available in traditional CNC controllers. The CNC machine operator does not require the assistance of the CNC programmer to re-create a brand new CNC "G" code Program with new tool information and definitions when a change is made.

The invention allows the CNC machine operator to define the new tools himself or herself using complex 3D and up to 8-axes tool compensation algorithms built into the CNC Controller. These algorithms also provide for automatic tool gouge avoidance protection through the exemplary embodiment of the Intelligent Database, which is a subset of data collection records obtained from the main database and revised by the element titled Central subroutine element as needed by records and variables passed from the main Database subroutine element. The variables in the Intelligent Database are looked up by the Central subroutine element to further process and refine the multiple axes tool compensation calculation by comparing past conditions, errors and events.

PositionData1(Var1,Var2,Var3,Var4,Var5,Var6,Var7,Var8).
Etc . . . to Nth PositionData#.
ErrorAmount1(Var1,Var2,Var3,Var4,Var5,Var6,Var7,Var8).
Etc . . . to Nth ErrorAmount#.
EventAtBlock1(Var1,Var2,Var3,Var4,Var5,Var6,Var7,Var8).
Etc . . . to Nth EventAtBlock#.
ConditionType1(Var1,Var2,Var3,Var4,Var5,Var6,Var7,Var8).
Etc . . . to Nth ConditionType#.
ConditionTime1(Var1,Var2,Var3,Var4,Var5,Var6,Var7,Var8).
Etc . . . to Nth ConditionTime#.

The element titled as Intelligent Database subroutine calls, ties to and works together with the Element titled DbAtr enumerated as paragraph (0043), Element titled DbGet enumerated as paragraph (0044), Element titled DbSet enumerated as paragraph (0045) and Element titled DbSetAtrCur enumerated as paragraph (0046) of the Computer Program Listing on compact disc (See, Appendix A).

The individual descriptions of the command usage for Multi-axes Tool Compensation are as set forth below:

These commands enable 3D and up to 8-axes tool compensation. There are eight possible parameters: OFF, LEFT, RIGHT, 3DCOMP, 3DADJUSTZ, 3DOFFSET, 8AXIS and LLIMIT45. These parameters are usually associated with G40, G41, G42, G130, G131, G132 and G135. The compensation value is taken from the tool parameter screen for that specific tool number.

All tool compensation is preprocessed when the file is loaded into memory. If a tool size is changed or one edits the "G" code program to reflect a change in tool compensation methods, then the program will automatically reprocess and redraw the "G" code program. If one uses 3D or up to 8-axes tool compensation, the CAD/CAM system will need to include the special codes on each "G" code line that will need to be compensated. The special codes represent a normalized 3D vector and the L code represents a conical angle measured from the XYZ point to the nearest obstacle from a flat 2D plane. If one specifies an angle after LLIMIT, then the tool position may be completely omitted in order to automatically avoid gouging. This occurs if the included angle α between the vector and the L code is less than the value specified after LLIMIT. The default of LLIMIT is 45 degrees. To turn gouge protection off, specify a zero value after LLIMIT 0. Take caution if the tool size is increased at the control, which is larger than the original. An obstacle may exist beyond the diameter of the original tool size that may result in an unforeseen gouge. If the tool size is decreased from the original size by either wear or a tool change, then there may be some extra stock left in tight corners since possible gouges were originally determined for a larger tool.

| EXAMPLES: | 'Turns all compensation off. |
|---|---|
| TOOLCOMP OFF | |
| TOOLCOMP LEFT | 'Comps in 2D to the left. |
| TOOLCOMP RIGHT | 'Comps in 2D to the right. |
| TOOLCOMP 3DCOMP | '3D comp based on vector and gouge parameter. |
| TOOLCOMP 3DADJUSTZ | '3D comp lifts Z axis only but keeps X, Y. |
| TOOLCOMP 3DOFFSET | '3D parallel offset only - based on vector and no 'gouge parameter. |
| TOOLCOMP 8AXIS | '8-axes comp based on vector and gouge parameter. |
| TOOLCOMP LLIMIT45 | 'Give angle which will specify a gouge to omit tool 'position. |

The use of the L code represents a conical angle measured from the tool tip point to the nearest obstacle from a flat 2D plane. If the user specifies an angle after LLIMIT, then the tool position move may be completely omitted by the machine if an obstacle is encountered on the part surface in order to automatically avoid gouging as part of the central set of math routine algorithms.

Element Title: Gouge Subroutine.
L!=the value given after the LLIMIT command.

$L=(D/\mathrm{Sin}(L!))$.

If L<0 Then skip this move.
Otherwise, combine this value with the D distance value to arrive at a new distance to compensate.

$D=D+L$.

In order to carry out this aspect of the invention, the description presents a group of elements titled as the collection of mathematical subroutine elements and enumerated here as Paragraphs (0031) through (0054) of the Computer Program Listing on compact disc (See, Appendix A).

Figure 11:
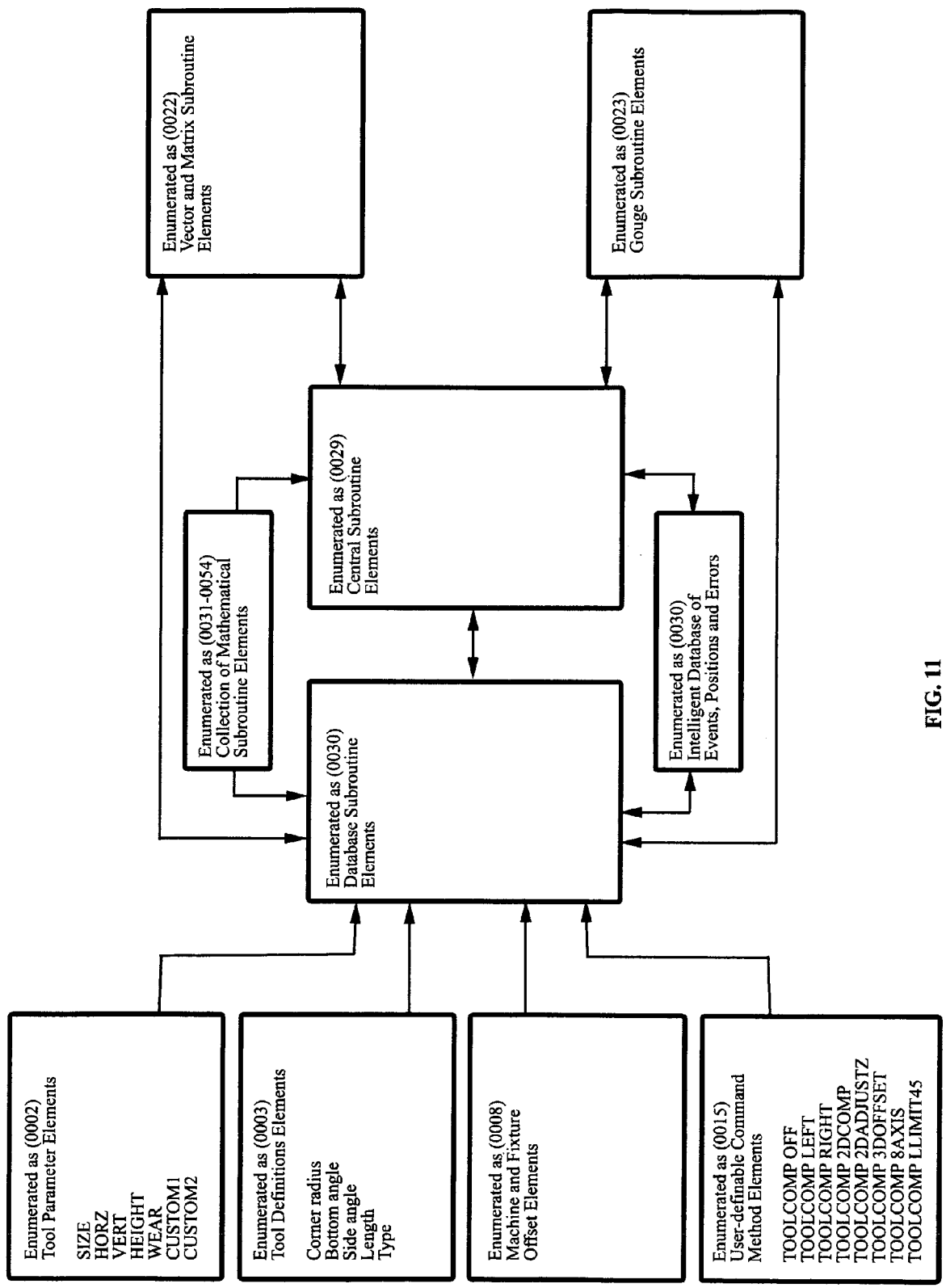

The provided flowchart in block diagram form, FIG. 11, recites all of the elements, components and steps completely constituting every aspect of the technology elements enumerated as Paragraphs (0030) titled as Intelligent Database subroutine and Database subroutine of the Computer Program Listing on compact disc (See, Appendix A) which calls, ties to and works together with the group of elements titled the collection of mathematical subroutine elements enumerated as Paragraphs (0031) through (0054) of the Computer Program Listing on compact disc (See, Appendix A) and specifically linked to and shown in FIG. 11 of the block diagram as it interacts with the Element titled DbAtr enumerated as paragraph (0043) of the Computer Program Listing on compact disc (See, Appendix A), Element titled DbGet enumerated as paragraph (0044), Element titled DbSet enumerated as paragraph (0045) and Element titled DbSetAtrCur enumerated as paragraph (0046) of the Computer Program Listing on compact disc (See, Appendix A).

Figure 10:
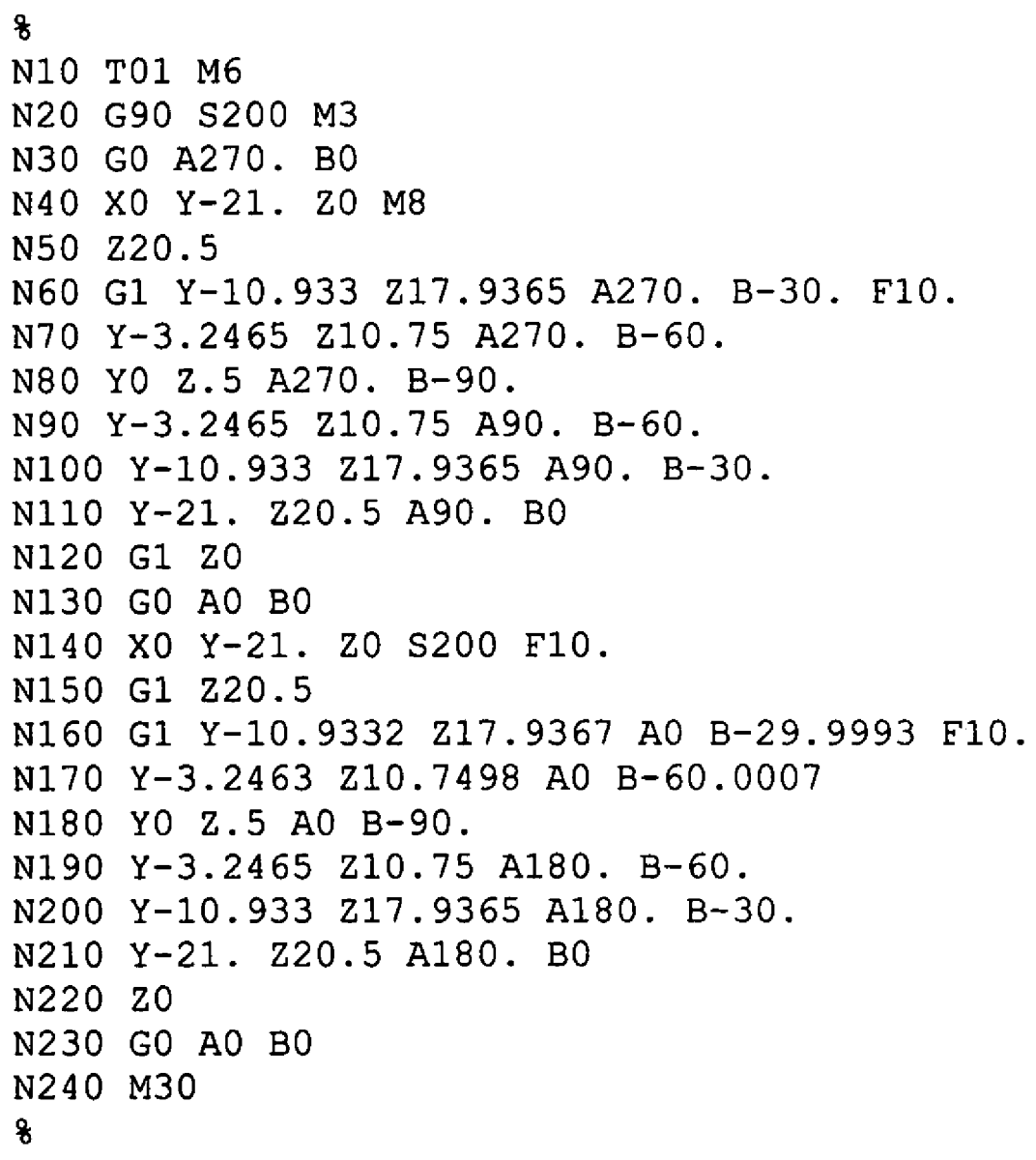

The technology element that calculates Multi-Axes Tool Compensation internal to a central mathematical set of algorithms in memory of the CNC Controller which ties all of the provided set of commands together as described and shown in the provided flowchart in block diagram form, FIG. 11, enumerated as paragraph (0030) titled as Intelligent Database subroutine and Database subroutine which calls and ties to and works together with the group of elements titled the collection of mathematical subroutine elements enumerated as paragraphs (0031) through (0054) of the Computer Program Listing on compact disc (See, Appendix A) and specifically linked to and shown in FIG. 11 of the block diagram as it interacts with the Element titled DbAtr enumerated as paragraph (0043) of the Computer Program Listing on compact disc (See, Appendix A), Element titled DbGet enumerated as paragraph (0044), Element titled DbSet enumerated as paragraph (0045) and Element titled DbSetAtrCur enumerated as paragraph (0046) of the Computer Program Listing on compact disc (See, Appendix A). To further recite all of the elements, components and steps completely constituting every aspect of the invention, I further list and explain the technology elements as comprising user settings to his or her preferences for the values or amounts to compensate into boxes on an operator screen, such as the exemplary screen in FIG. 2 for the boxes labeled tool size, horizontal offset, vertical offset, tool wear, corner radius, bottom angle, side angle and tool length. These interact with the "G" code program as shown in FIG. 10 and other values optionally inputted or gathered as variables when the math calculations are performed. The user input boxes on FIG. 2 specifically are read and stored by the Subroutine Element Form_Load enumerated as (0031) which reads in all data from user input boxes from FIG. 2 and stores them into the Database Element as described and enumerated as paragraph (0030) (See, Appendix A).

Further database variables and user settings—including public, global and/or private call—ties to and works together with the database element titled subroutine DbAtr enumerated as (0043) which is a Database element to store geometry properties, error conditions and positions. This ties to and works with the Element titled Intelligent Database subroutine enumerated as paragraph (0030) and the database element titled Subroutine DbGet enumerated as (0044) which gets Database item coordinate, property and position from random file which works with the Element titled Intelligent Database subroutine enumerated as paragraph (0030), the database element titled Subroutine DbSet enumerated as (0045) of the Computer Program Listing on compact disc (See, Appendix A). The DbSet Database element sets item coordinate, property and position from random file. The database element titled Subroutine GloRead enumerated as (0032) reads in all global and public data from user input boxes plus any proprietary settings from FIG. 2 and stores them into the Database Element as described in and enumerated as paragraph (0030) titled as Intelligent Database subroutine and Database subroutine. The user must repeat the steps entering his or her preferences for each tool description. There is no limit to the number of tools, machine types or tool shape combinations to enter. An industry standard "G" Code program, as in FIG. 10, containing tool positions based on non-compensated original part geometry data, interact with the Multi-Axes tool compensation calculations when they are applied. These are the original tool positions that the user supplies in which the calculations are applied. These interact with values provided on the tool parameter screen. For each multi-axes X,Y,Z,A,B,C value entered in the "G" Code program, the Controller will calculate a compensated value based on the amounts entered into the tool parameter screen as in the exemplary screen in FIG. 2. A set of optional text entered commands are provided to interact and be directly entered onto the operator screen to override or toggle features on/off and adjust values:

| | |
|---|---|
| TOOLCOMP OFF | 'Turns all compensation off. |
| TOOLCOMP LEFT | 'Comps tool in 2D to the left. |
| TOOLCOMP RIGHT | 'Comps tool in 2D to the right. |
| TOOLCOMP 3DCOMP | '3D comp based on vector and gouge parameter. |
| TOOLCOMP 3DADJUSTZ | '3D comp lifts Z axis only but keeps X, Y. |
| TOOLCOMP 3DOFFSET | '3D parallel offset only -- based on vector and 'no gouge parameter. |
| TOOLCOMP 8AXIS | '8-axes comp based on vector and gouge parameter. |
| TOOLCOMP LLIMIT45 | 'Give angle which will specify a gouge to omit tool. |

Figure 8:
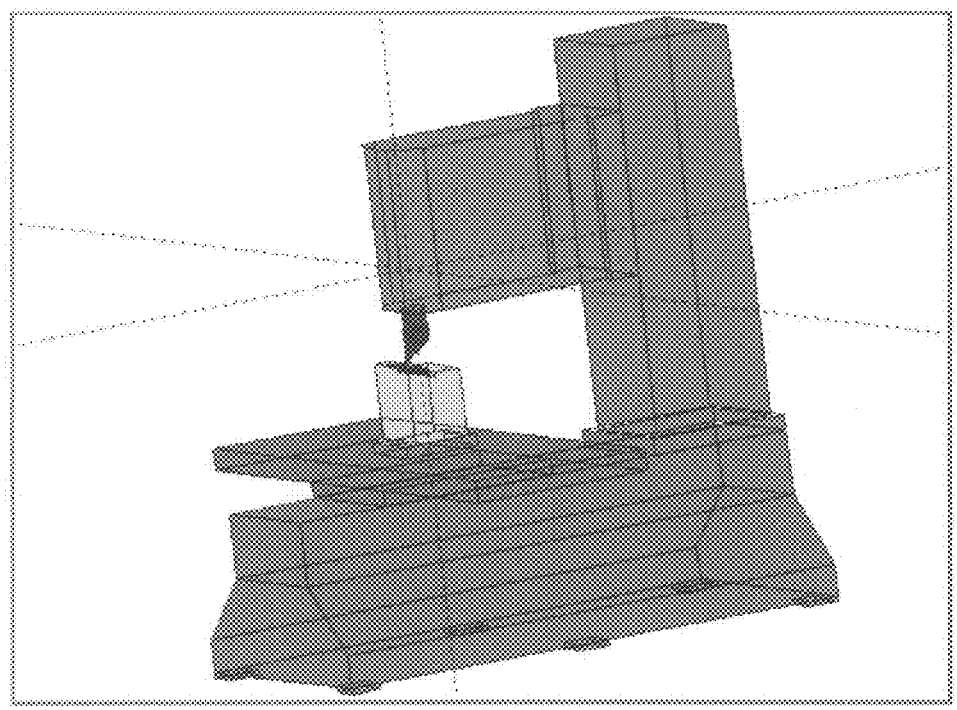
FIG. 8 is a perspective view of a CNC machine tool embodying features of the present invention.
Figure 9:
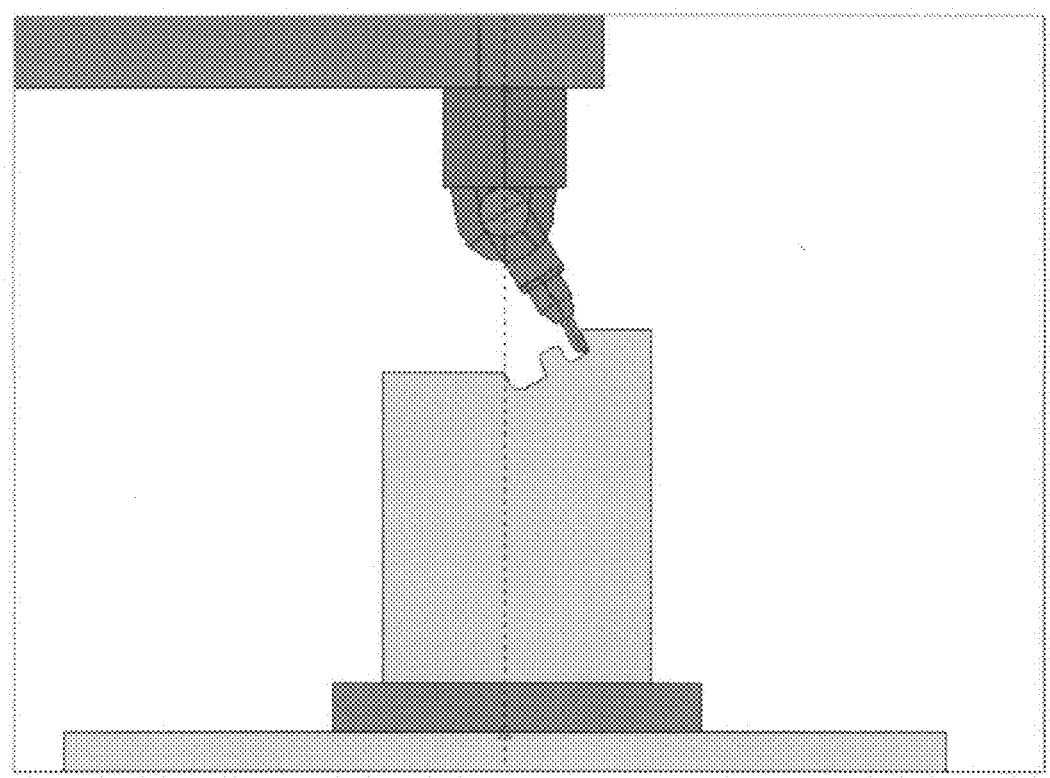
FIG. 9 is a side elevational view of the CNC machine tool shown in FIG. 8.

Furthermore a multi-axes tool positioner in a tool holder mounted to a machine's spindle cuts the part as shown in FIG. 8 and FIG. 9. The process of gathering the user-entered information, preferences, values, amounts, on/off options on the operator screen, as in FIG. 2, or as entered by optional text commands, as they interact with the original tool positions as provided in the "G" code program, as in FIG. 10, to provide the mathematical variables when processed by a set of described central mathematical routines are internal to the CNC Controller. The various methods for gathering the information are incidental as to how the central set of math routines that perform these calculations receive them.

Figure 4:
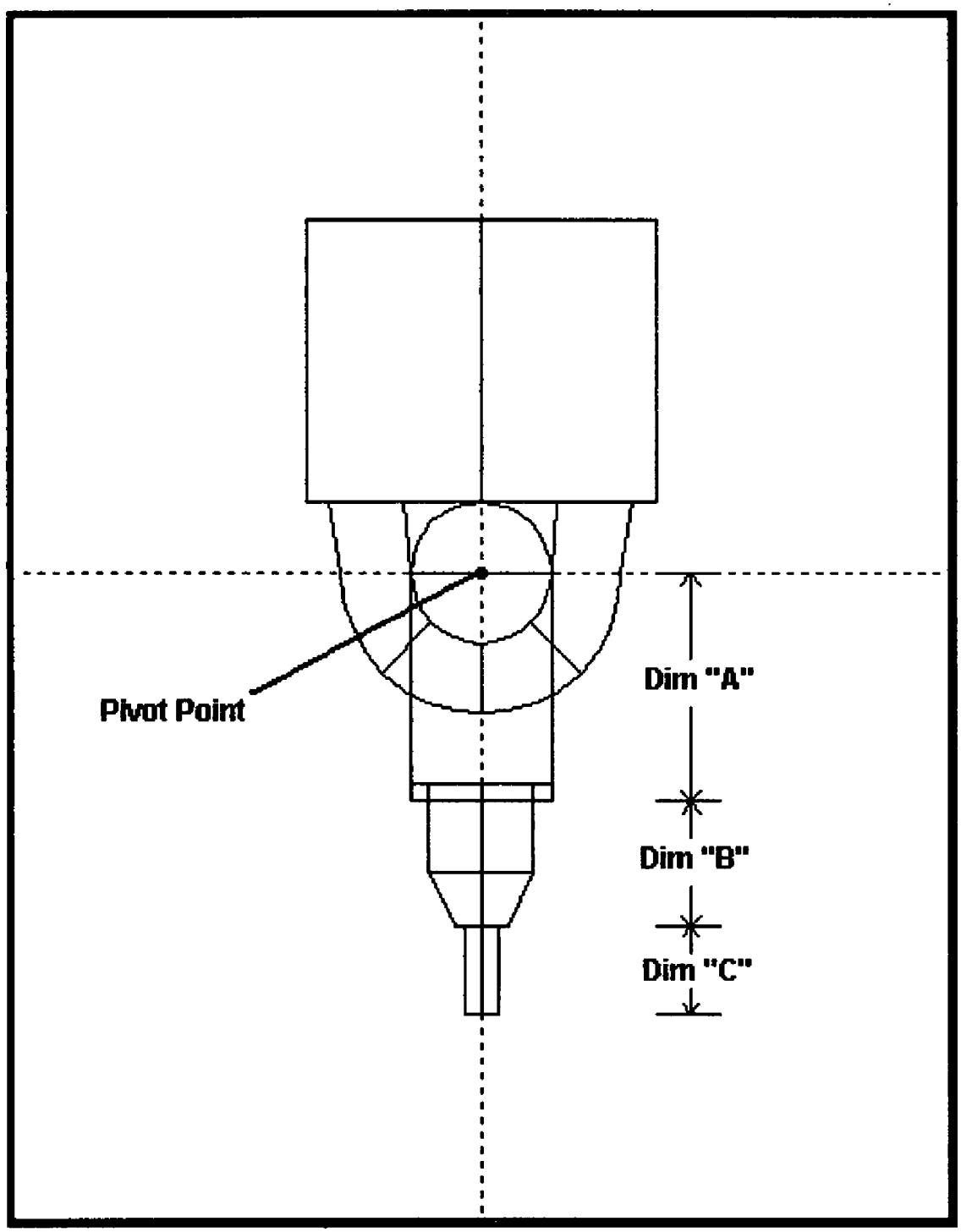
FIG. 4 is a view similar to FIG. 3, but here illustrating the central pivot point in a CNC machine tool embodying the invention.
Figure 5:
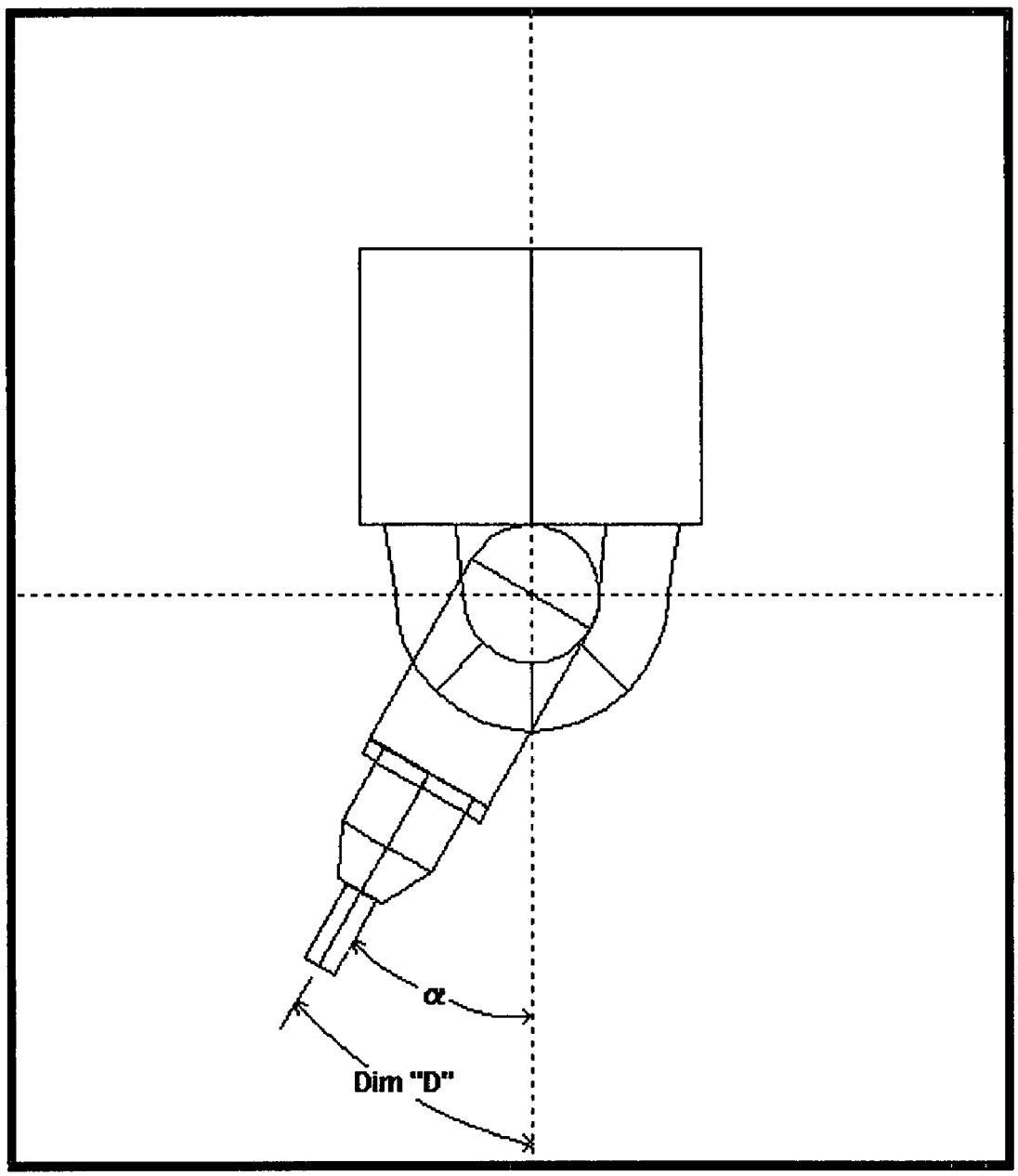
FIG. 5 is a view similar to FIGS. 3 and 4 depicting the exemplary CNC machine tool's spindle and tool pivoted through an acute included angle α with the spindle's original vertical axis.
Figure 6:
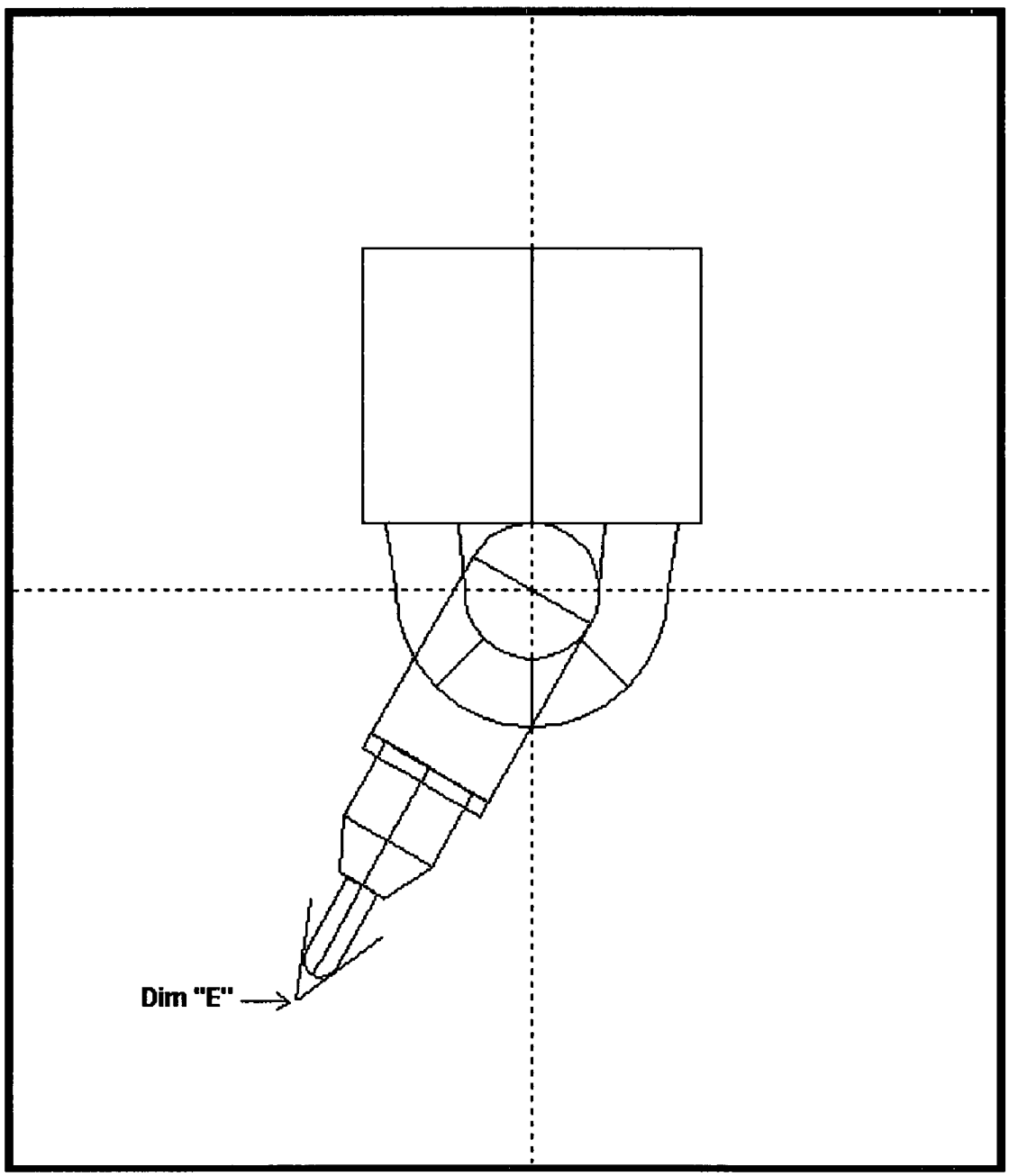
FIG. 6 is a diagrammatic view similar to FIGS. 4 and 5 depicting an area surrounding the tip of the tool comprising a gouge avoidance zone.
Figure 7:
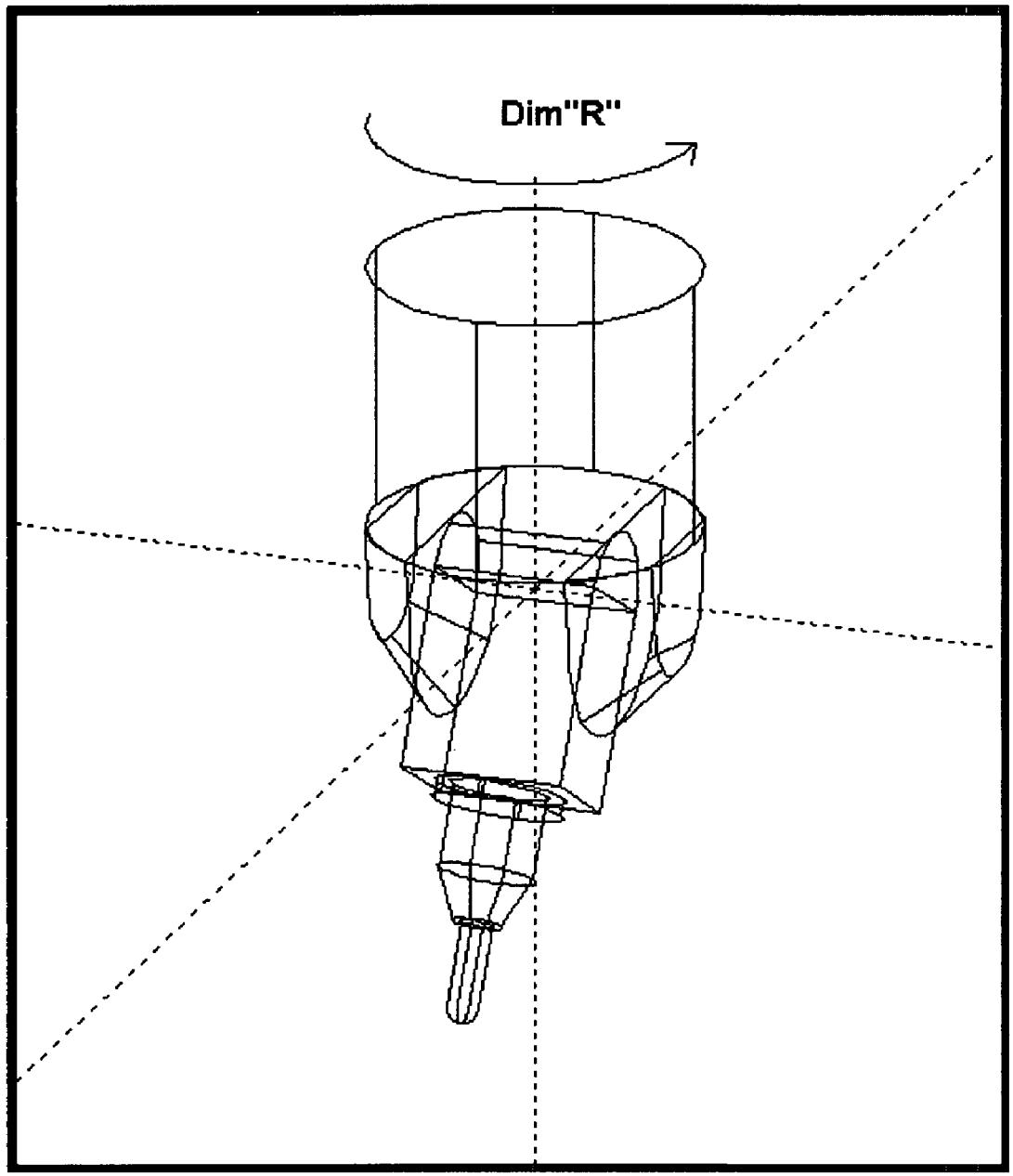
FIG. 7 is a diagrammatic isometric view depicting the rotational characteristics of an exemplary CNC machine tool embodying features of the present invention.

The elements and components are depicted in FIG. 4 Item 5, FIG. 5 DIM "D" Item 6, FIG. 6 DIM "E" Item 7, and FIG. 7 DIM "R" Item 8 which automatically calculates tool gouge avoidance protection internal to the CNC Controller are a central set of math routine algorithms as shown in the relationships between the Tool Parameter, Tool Definitions, Machine and Fixture offset elements and how they work together are shown by flowchart in block diagram form, as in FIG. 11. The relationships in paragraphs enumerated as (0024) through (0028) (See, Appendix A) comprise the manner in which the necessary parameters are gathered from the user and stored using computer variables within the computer's memory as shown in paragraph enumerated as (0030) as the element titled Database subroutine then passed to the subroutines of the technology element as depicted in paragraphs (0022) as the element titled Vector and Matrix subroutine, (0023) as the element titled Gouge subroutine and (0029) as the element titled Central subroutine of the Computer Program Listing on compact disc (See, Appendix A).

The invention also embodies a method of calculating tool gouge avoidance and tool protection which automatically contains algorithms to lift the tool to safe positions or skip the move when necessary by determining if the LLIMIT parameter, as shown in FIG. 6 DIM "E" Item 7, is in violation of any surrounding obstacles as determined by a user-defined variable value as entered on the operator screen in FIG. 2. Relationships between the Tool Parameter, Tool Definitions, Machine and Fixture offset elements and how they work together are shown by flowchart in block diagram form as in FIG. 11. As the key objective, I make use of a function using the LLIMIT element in the algorithm to be processed by the element titled Gouge subroutine described in paragraph enumerated as (0023) (See, Appendix A). I further recite the relationships in paragraphs enumerated as (0001) through (0012) as the manner in which the necessary parameters are gathered from the user and stored using computer variables within the computer's memory as shown in paragraph enumerated as (0030) as the element titled Database subroutine then passed to the subroutines of the technology element as depicted in paragraphs (0022) as the element titled Vector and Matrix subroutine and (0029) as the element titled Central subroutine of the Computer Program Listing on compact disc (See, Appendix A).

A specific method of the invention is an element to redefine, replace and override the tool position coordinates when the tool characteristics change. Relationships between the user-definable command method elements and how they work together are shown in the flowchart in block diagram form as in FIG. 11. As the key objective, I use a method of user-definable command elements that override, replace and redefine the variables gathered from the user and stored using computer variables within the computer's memory as shown in paragraph enumerated as (0030) as the element titled Database subroutine of the Computer Program Listing on compact disc (See, Appendix A).

As another key component of the invention, a unique algorithm element is employed that expands the intelligence of each calculation for compensated tool positions based on an artificial intelligence algorithm element. The artificial intelligence algorithm element is actually a live, real-time, ever-changing database in the machine's memory that remembers by learning from what the machine can and cannot do. As previously described, the database is a storage of events, variables as an internal list of conditions and positions kept in standard random access memory as outlined by the various variables used by the central set of math algorithms. Specifically, it is pointed out that an element recited as a method to store events, conditions, positions and errors into computer variables within the computer's memory as shown in paragraph enumerated as (0030) as the element titled Database Subroutine of the Computer Program Listing on compact disc (See, Appendix A). Relationships between the intelligent database element that stores the events, conditions, positions and errors into computer variables and how they work together are shown in the flowchart in block diagram form as shown in FIG. 11.

Directing attention now to the individual descriptions of each element of the invention as set forth below:

The Subroutine Element GloRead reads in all global and public data from user input boxes plus any proprietary settings from FIG. 2 and stores them into the Database Element as described in and enumerated as paragraph (0030) of the Computer Program Listing on compact disc (See, Appendix A).

The Subroutine Element ANG2VEC returns angle between two vectors and works together with and calls the functions in the element titled Database subroutine, Intelligent Database subroutine enumerated as paragraph (0030) and the element titled Central subroutine enumerated as paragraph (0029) of the Computer Program Listing on compact disc (See, Appendix A).

The Subroutine Element AngInArc tells if Angle given falls between arc angles and works together with and calls the functions in the element titled Database subroutine, Intelligent Database subroutine enumerated as paragraph (0030) and the element titled Central subroutine enumerated as paragraph (0029) of the Computer Program Listing on compact disc (See, Appendix A).

The Subroutine Element AngVec changes XYZ vectors to real Angles relative to plane and works together with and calls the functions in the element titled Database subroutine, Intelligent Database subroutine enumerated as paragraph (0030) and the element titled Central subroutine enumerated as paragraph (0029) of the Computer Program Listing on compact disc (See, Appendix A).

The Subroutine Element Arc3pt3D finds center of arc and radius given 3 points and works together with and calls the functions in the element titled Database subroutine, Intelligent Database subroutine enumerated as paragraph (0030) and the element titled Central subroutine enumerated as paragraph (0029) of the Computer Program Listing on compact disc (See, Appendix A).

The Subroutine Element ArcEnd calculates the ends of arc positions in 3D and works together with and calls the functions in the element titled Database subroutine, Intelligent Database subroutine enumerated as paragraph (0030) and the element titled Central subroutine enumerated as paragraph (0029) of the Computer Program Listing on compact disc (See, Appendix A).

The Subroutine Element ArcLen calculates the length of arc positions in 3D and works together with and calls the functions in the element titled Database subroutine, Intelligent Database subroutine enumerated as paragraph (0030) and the element titled Central subroutine enumerated as paragraph (0029) of the Computer Program Listing on compact disc (See, Appendix A).

The Subroutine Element BiSectAng calculate Bisected 3D angles and works together with and calls the functions in the element titled Database subroutine, Intelligent Database subroutine enumerated as paragraph (0030) and the element titled Central subroutine enumerated as paragraph (0029) of the Computer Program Listing on compact disc (See, Appendix A).

The Subroutine Element BISECVEC calculate Bisected 3D vectors and works together with and calls the functions in the element titled Database subroutine, Intelligent Database subroutine enumerated as paragraph (0030) and the element titled Central subroutine enumerated as paragraph (0029) of the Computer Program Listing on compact disc (See, Appendix A).

The Subroutine Element CrLnIfInt calculates 3D Circle/Line Intersections and works together with and calls the functions in the element titled Database subroutine, Intelligent Database subroutine enumerated as paragraph (0030) and the element titled Central subroutine enumerated as paragraph (0029) of the Computer Program Listing on compact disc (See, Appendix A).

The Subroutine Element CrossErr calculates errors in tool comp and works together with and calls the functions in the element titled Database subroutine, Intelligent Database subroutine enumerated as paragraph (0030) and the element titled Central subroutine enumerated as paragraph (0029) of the Computer Program Listing on compact disc (See, Appendix A).

The Subroutine Element DbAtr stores Database geometry properties, error, conditions and positions; and, works with the Element titled Intelligent Database subroutine enumerated as paragraph (0030) of the Computer Program Listing on compact disc (See, Appendix A).

The Subroutine Element DbGet gets Database item coordinate, property and position from random file; and, works with the Element titled Intelligent Database subroutine enumerated as paragraph (0030) of the Computer Program Listing on compact disc (See, Appendix A).

The Subroutine Element DbSet sets Database item coordinate, property and position from random file; and, works with the Element titled Intelligent Database subroutine enumerated as paragraph (0030) of the Computer Program Listing on compact disc (See, Appendix A).

The Subroutine Element DbSetAtrCur stores, retrieves and records current database variables in memory to work together with the Element titled Intelligent Database subroutine enumerated as paragraph (0030) of the Computer Program Listing on compact disc (See, Appendix A).

The Subroutine Element DefPIn3pts finds 3D plane vector normals and works together with and calls the functions in the element titled Database subroutine, Intelligent Database subroutine enumerated as paragraph (0030) and the element titled Central subroutine enumerated as paragraph (0029) of the Computer Program Listing on compact disc (See, Appendix A).

The Subroutine Element LnTan2Arc calculates 3D Line Tangent to Arc at Angle Intersections and works together with and calls the functions in the element titled Database subroutine, Intelligent Database subroutine enumerated as paragraph (0030) and the element titled Central subroutine enumerated as paragraph (0029) of the Computer Program Listing on compact disc (See, Appendix A).

The Subroutine Element LnTan2Arcs calculates 3D Line Tangent to two Arcs at Angle Intersections and works together with and calls the functions in the element titled Database subroutine, Intelligent Database subroutine enumerated as paragraph (0030) and the element titled Central subroutine enumerated as paragraph (0029) of the Computer Program Listing on compact disc (See, Appendix A).

The Subroutine Element LnTanArcPt calculates 3D Line Tangent to arc through point and works together with and calls the functions in the element titled Database subroutine, Intelligent Database subroutine enumerated as paragraph (0030) and the element titled Central subroutine enumerated as paragraph (0029) of the Computer Program Listing on compact disc (See, Appendix A).

The Subroutine Element MidArc finds midway point of 3D arc and works together with and calls the functions in the element titled Database subroutine, Intelligent Database subroutine enumerated as paragraph (0030) and the element titled Central subroutine enumerated as paragraph (0029) of the Computer Program Listing on compact disc (See, Appendix A).

The Subroutine Element OffCR offsets a circle in 3D and works together with and calls the functions in the element titled Database subroutine, Intelligent Database subroutine enumerated as paragraph (0030) and the element titled Central subroutine enumerated as paragraph (0029) of the Computer Program Listing on compact disc (See, Appendix A).

The Subroutine Element OffLN offsets a line in 3D and works together with and calls the functions in the element titled Database subroutine, Intelligent Database subroutine enumerated as paragraph (0030) and the element titled Central subroutine enumerated as paragraph (0029) of the Computer Program Listing on compact disc (See, Appendix A).

The Subroutine Element Tilt3D tilts and rotates a tool for tool comp and works together with and calls the functions in the element titled Database subroutine, Intelligent Database subroutine enumerated as paragraph (0030) and the element titled Central subroutine enumerated as paragraph (0029) of the Computer Program Listing on compact disc (See, Appendix A).

APPENDIX

Applicant is appending hereto as Appendix "A" a compact disc containing all computer instructions, routines, subroutines, algorithms and other information needed, including a central set of all math routine algorithms, which are programmable into a CNC machine tool Controller in order to enable that machine tool, and its operator, to carry out any desired 3D multi-axes machining, shaping and/or contouring operation with real-time instantaneous compensations necessary to prevent undesirable, but inherently encountered, X, Y and/or Z tool deflections from the desired pre-programmed path of tool movement. It is intended that such Appendix "A" be made a part of the file history relating to this application, and, therefore, material which is available for public inspection by interested parties. It is not intended that this material be printed as part of any patent issuing from this application.

It will be understood by persons skilled in the art that Appendix "A" contains materials which are deemed sensitive and highly proprietary by Applicant and his corporation— viz., CamSoft Corporation—and are not to be duplicated, in whole or in part, without the express written consent, with all suitable restrictions on use or disclosure to others, of CamSoft Corporation.

I claim:

1. A CNC machine tool having a CNC Controller, a workpiece support, a cutting tool tip in a tool head including a motor and a spindle for holding a tool with the spindle being: i) pivotable in any direction about a pivot point so as to define an acute included angle α with a Z-axis coordinate passing through the pivot point; ii) rotatable through any desired angle of rotation β about that pivot point; and iii) displaceable in any of three orthogonal X, Y and Z axes in an orthogonal 3D X,Y,Z coordinate system, the improvement comprising the CNC Controller for generating instructions controlling the motor and movement of the tool head relative to a workpiece mounted in the workpiece support, said CNC Controller including:
  a) first means for establishing a predetermined programmed path of movement of the tool head, spindle and tool relative to the workpiece;
  b) second means for generating instructions transmitted to said tool head and motor to cause said tool to move along said programmed path with movement along said path in predetermined ones of at least two of said X, Y and Z axes;
  c) third means for recording and storing the magnitudes of all X, Y and Z displacements of said tool including the magnitude of all angular displacements of said tool as a result of pivotal movement of said spindle and rotational movement of said tool about the Z-axis coordinate passing through said pivot point, the rate of change of each said displacements, the location of the tool in said orthogonal X, Y, Z coordinate system, and changes in the dimensions of said tool;
  d) fourth means for generating instructions for tilting said spindle through an acute angle α with the Z-axis coordinate passing through said pivot point and at any desired rotational angle β about said axis so as to inherently induce unwanted displacement of the cutting tool tip of said tool in at least two of said X, Y and Z coordinates, and for transmitting said tilting instructions to said tool head and motor; and,
  e) fifth means responsive to the unwanted displacements in at least two of said X, Y and Z coordinates induced by said fourth means for generating compensatory displacements of said tool in the ones of said X, Y and Z coordinates where unwanted displacements are occurring with said compensatory displacements being generated: i) simultaneously in real time with said unwanted displacements; ii) equal in magnitude with respect to said unwanted displacements; iii) opposite in direction with respect to said unwanted displacements; and iv) at the same rate of change as the rate of change of said unwanted displacements, and transmitting compensatory displacement instructions to said tool head and motor to perform said compensatory displacements; whereby, the cutting tool tip of said tool remains precisely on said programmed path of tool movement at all times irrespective of the unwanted displacements inherently resulting from the tilting instructions generated by said fourth means.

2. The CNC machine tool having the CNC Controller as set forth in claim 1, the improvement further comprising the tool displaceable along any axis in an orthogonal 3D X,Y,Z coordinate system and at any desired acute included angle α with respect to the Z-axis coordinate passing through said pivot point and at any desired rotational angle β about said Z-axis coordinate passing through said pivot point; and the CNC Controller generating displacement signals necessary to move said tool along up to 8 axes in said orthogonal 3D X,Y,Z coordinate system while simultaneously generating compensatory X,Y,Z displacement signals equal in magnitude, opposite in direction, and at the same rate of change with respect to any displacement signal tending to displace said tool from said programmed path of movement so as to maintain said tool precisely on said path at all times irrespective of unwanted X,Y,Z deflections tending to displace said tool from said path.

3. The CNC machine tool having the CNC Controller as set forth in claim 1, wherein said CNC Controller includes means for recording and storing data relating to topographical conditions and irregularities present on the workpiece being machined; and said CNC Controller includes means for generating avoidance instructions ensuring that during transit of said tool along said programmed path, interference between said tool said topographical conditions and irregularities are precluded by shifting said tool out of zone of said topographical conditions and irregularities; and transmitting said avoidance instructions to said tool head and motor.

4. The CNC machine tool having the CNC Controller as set forth in claim 3, wherein said avoidance instructions ensure: i) automatic gouge avoidance protection; and ii) relocation of said tool to safe positions when necessary.

5. A CNC Controller for use with a CNC machine tool having a workpiece support, a cutting tool tip in a tool head, a pivot point, a tool supporting spindle pivotally mounted on the head, and a motor drivingly coupled to the head and spindle for moving the tool along a predetermined path in a 3D X,Y,Z coordinate system and for deploying the tool in selected ones of up to 8 axes upon receipt of suitable drive instructions from the CNC Controller, said CNC Controller comprising, in combination:
  a) first programmable means for establishing a predetermined path of tool movement in the 3D X,Y,Z coordinate system and for generating tool displacement instructions and transmitting said displacement instructions from said CNC Controller to the tool head, spindle and motor for moving the tool along the established predetermined path of movement;
  b) second means for recording and storing: i) the magnitudes of all X, Y and Z displacements of the tool; ii) the magnitudes of all angular displacements of the tool through acute included angles α with the Z coordinate passing through the pivot point as a result of pivotal movement of the spindle and tool; iii) the magnitudes of all rotational angles β of the tool about the Z coordinate passing through the pivot point; iv) the magnitudes of all X, Y and Z tool displacements resulting from pivoting of the tool through all acute included angles α at all rotational angles β; v) the precise location of the cutting tool tip at all X, Y, Z coordinate positions as the tool moves along said predetermined path of movement; and vi) the dimensions of each tool mounted in the spindle;

c) third means for generating instructions for tilting the spindle through any desired acute included angle α at any desired rotational angle β and for transmitting said tilting instructions from said CNC Controller to the CNC machine tool head and motor, thereby tilting the tool and inducing unwanted tool displacements from at least two of the X, Y, Z coordinate positions of the tool as it moves along the programmed path of movement in the 3D X,Y,Z coordinate system; and, d) fourth means responsive to all unwanted X, Y, Z tool displacements induced as a result of said third means generation of said tool tilting instructions for generating compensatory X, Y, Z tool displacements in the ones of said X, Y, Z coordinates where unwanted displacements are occurring as a result of generation of tilting instructions by said third means with said compensatory displacement being: i) simultaneous in real time with said unwanted displacements; ii) equal in magnitude with respect to said unwanted displacements; iii) opposite in direction with respect to said unwanted displacements; and iv) at the same rate of change as the rate of change of said unwanted displacements, and for transmitting compensatory displacement instructions to the tool head and motor simultaneous with transmission of said tilting instructions by said third means to perform said compensatory displacement;

whereby the cutting tool tip of the tool remains precisely on said programmed path of tool movement in the 3D X,Y,Z coordinate system at all times during and following tilting of the tool by said third means, all irrespective of any unwanted displacements inherently resulting from the tilting instructions generated by said third means.

6. The CNC Controller as set forth in claim 5, further comprising the tool displaceable along any axis in an orthogonal 3D X,Y,Z coordinate system and at any desired acute included angle α with respect to the Z-axis coordinate passing through said pivot point and at any desired rotational angle β about said Z-axis coordinate passing through said pivot point, and the CNC Controller generating displacement signals necessary to move said tool along up to 8 axes in said orthogonal 3D X,Y,Z coordinate system while simultaneously generating compensatory X,Y,Z displacement signals equal in magnitude, opposite in direction, and at the same rate of change with respect to any displacement signal tending to displace said tool from said programmed path of movement so as to maintain said tool precisely on said path at all times irrespective of unwanted X,Y,Z deflections tending to displace said tool from said path.

7. The CNC Controller as set forth in claim 5, wherein said CNC Controller includes means for recording and storing data relating to topographical conditions and irregularities present on a workpiece being machined; and said CNC Controller includes means for generating avoidance instructions ensuring that during transit of said tool along said programmed path, interference between said tool and said topographical conditions and irregularities are precluded by shifting said tool out of said topographical conditions and irregularities; and transmitting said avoidance instructions to said tool head and motor.

8. The CNC Controller as set forth in claim 7, wherein said avoidance instructions ensure: i) automatic gouge avoidance protection; and ii) relocation of said tool to safe positions when necessary.

9. In a CNC machine tool having a workpiece support, a cutting tool tip in a tool head including a motor and a spindle for holding the tool with the spindle being: i) pivotable in any direction about a pivot point so as to define an acute included angle α with a Z-axis coordinate passing through the pivot point; ii) rotatable through any desired angle of rotation β about said pivot point; and iii) displaceable in any of three orthogonal X, Y and Z axes, a method of programming the motion of the CNC machine tool with a CNC Controller comprising the steps of:

a) establishing a predetermined path of movement of the tool head, spindle and tool relative to a workpiece and in a 3D orthogonal X,Y,Z coordinate system and programming the established predetermined path of movement in the CNC Controller;

b) generating instructions in the CNC Controller to cause the tool to move along the predetermined path of movement during a machining operation and transmitting the generated instructions to the tool head and motor for initiating and carrying out the machining operation programmed into the CNC Controller;

c) recording and storing in the CNC Controller the magnitudes of i) X, Y and Z displacements of the tool during the machining operating including ii) the magnitudes of angular displacements α and β of the tool as a result of pivotal movement of the spindle and rotation of the tool about the pivot point;

d) recording and storing in the CNC Controller the rate of change of each tool displacement, the location of the tool in the 3D orthogonal X,Y,Z coordinate system, and changes in the dimensions of the tool;

e) generating instructions in the CNC Controller for tilting the spindle and tool through an acute included angle a between the spindle and the Z-axis coordinate passing through the pivot point and at any desired rotational angle β about the Z-axis coordinate passing through the pivot point, and transmitting the tilting instructions generated in the CNC Controller to the tool head and motor; and, f) generating compensatory displacement instructions in the CNC Controller responsive to any unwanted X, Y, Z tool displacements occurring during step (e) with the compensatory displacement instructions being: i) simultaneous in real time with any unwanted X, Y, Z displacements occurring during step (e), ii) equal in magnitude with respect to any unwanted displacements occurring in step (e), iii) opposite in direction with respect to any unwanted displacements occurring in step (e), and iv) at the same rate of change with respect to the rate of change of any unwanted displacements occurring in step (e), and transmitting the compensatory displacement instructions to the tool head and motor;

whereby the cutting tool tip of the tool remains precisely on the programmed path of tool movement at all times irrespective of any unwanted tool displacements which inherently result from the tilting instructions generated in step (e).

10. The method of programming the motion of the CNC machine tool as set forth in claim 9, further including the step of generating instructions in the CNC Controller for displacing the tool along any X,Y,Z axis in a 3D orthogonal X,Y,Z coordinate system, at any acute included angle α of the tool with respect to the Z-axis coordinate passing through the pivot point, and at any rotational angle β about the pivot point so that the tool is moved along said path of movement in any desired ones of up to 8 axes.

11. The method of programming the motion of the CNC machine tool as set forth in claim 9, further including the steps of:

g) recording and storing data in the CNC Controller relating to topographical conditions and irregularities present on the workpiece being machined;

h) generating avoidance instruction in the CNC Controller ensuring that during transit of the tool along said programmed path, interference between the tool and said topographical conditions and irregularities are precluded by shifting the tool out of a zone of said topographical conditions and irregularities; and i) transmitting the avoidance instructions generated in step (h) to the machine tool head and motor.

12. The method of programming the motion of the CNC machine tool as set forth in claim 11, wherein the avoidance instructions generated in step (h) ensure: i) automatic gouge avoidance protection; and ii) relocation of the tool to safe positions when necessary.

* * * * *